(12) United States Patent
Ebbers et al.

(10) Patent No.: US 12,066,546 B2
(45) Date of Patent: Aug. 20, 2024

(54) ELECTRO-OPTIC MODULATOR AND METHODS OF USING AND MANUFACTURING SAME FOR THREE-DIMENSIONAL IMAGING

(71) Applicant: nLIGHT, Inc., Vancouver, WA (US)

(72) Inventors: Christopher Allen Ebbers, Bozeman, MT (US); Paul S. Banks, San Marcos, CA (US); Charles S. Tuvey, San Diego, CA (US)

(73) Assignee: nLIGHT, Inc., Camas, WA (US)

( * ) Notice: Subject to any disclaimer, the term of this patent is extended or adjusted under 35 U.S.C. 154(b) by 679 days.

(21) Appl. No.: 17/275,453

(22) PCT Filed: Sep. 11, 2019

(86) PCT No.: PCT/US2019/050696
§ 371 (c)(1),
(2) Date: Mar. 11, 2021

(87) PCT Pub. No.: WO2020/056059
PCT Pub. Date: Mar. 19, 2020

(65) Prior Publication Data
US 2022/0050205 A1 Feb. 17, 2022

Related U.S. Application Data

(60) Provisional application No. 62/729,862, filed on Sep. 11, 2018.

(51) Int. Cl.
*G01S 17/894* (2020.01)
*G01D 5/353* (2006.01)
*G02B 30/10* (2020.01)

(52) U.S. Cl.
CPC ........ *G01S 17/894* (2020.01); *G01D 5/35312* (2013.01); *G02B 30/10* (2020.01)

(58) Field of Classification Search
CPC .... G01S 17/894; G02B 30/10; G01D 5/35312
(Continued)

(56) References Cited

U.S. PATENT DOCUMENTS

| 5,381,253 A | 1/1995 | Sharp et al. |
| 2003/0042884 A1 | 3/2003 | Kingsley et al. |

(Continued)

FOREIGN PATENT DOCUMENTS

| CN | 1283282 A | 2/2001 |
| CN | 1414420 A | 4/2003 |

(Continued)

OTHER PUBLICATIONS

De Yorea, et al.; A study of residual stress and the stress-optic effect in mixed crystals of K(DxH1-x)2PO4. Journal of Applied Physics Jun. 1, 1993; 73 (11): 7780-7789. https://doi.org/10.1063/1.353951.
(Continued)

*Primary Examiner* — William Choi
(74) *Attorney, Agent, or Firm* — Stoel Rives LLP

(57) ABSTRACT

Apparatuses, systems and methods for modulating returned light for acquisition of 3D data from a scene are described. A 3D imaging system includes a Fabry-Perot cavity having a first partially-reflective surface for receiving incident light and a second partially-reflective surface from which light exits. An electro-optic material is located within the Fabry-Perot cavity between the first and second partially-reflective surfaces. Transparent longitudinal electrodes or transverse electrodes produce an electric field within the electro-optic material. A voltage driver is configured to modulate, as a function of time, the electric field within the electro-optic material so that the incident light passing through the electro-optic material is modulated according to a modulation waveform. A light sensor receives modulated light that exits the second partially-reflective surface of the Fabry-
(Continued)

Perot cavity and converts the light into electronic signals. Three-dimensional (3D) information regarding a scene-of-interest may be obtained from the electronic signals.

20 Claims, 7 Drawing Sheets

(58) Field of Classification Search
USPC .......................................................... 359/315
See application file for complete search history.

(56) References Cited

U.S. PATENT DOCUMENTS

| | | |
|---|---|---|
| 2010/0040322 A1 | 2/2010 | Li et al. |
| 2012/0182600 A1 | 7/2012 | Nakamura et al. |
| 2016/0227194 A1 | 8/2016 | Kim et al. |

FOREIGN PATENT DOCUMENTS

| | | |
|---|---|---|
| CN | 1700038 A | 11/2005 |
| CN | 101144903 A | 3/2008 |
| CN | 101185020 A | 5/2008 |
| CN | 101552638 A | 10/2009 |
| CN | 101866056 A | 10/2010 |
| CN | 102169244 A | 8/2011 |
| CN | 102280809 A | 12/2011 |
| CN | 102292980 A | 12/2011 |
| CN | 102865833 A | 1/2013 |
| CN | 105379253 A | 3/2016 |
| CN | 105847784 A | 8/2016 |
| CN | 106662680 A | 5/2017 |
| CN | 106707295 A | 5/2017 |
| CN | 106791497 A | 5/2017 |
| CN | 106970483 A | 7/2017 |
| EP | 3059950 A2 | 8/2016 |
| JP | S5670522 A | 6/1981 |
| JP | 2014063098 A | 4/2014 |
| WO | 2006137408 A1 | 12/2006 |

OTHER PUBLICATIONS

International Search Report and Written Opinion for International Patent Application No. PCT/US2019/050696, mailed Jan. 23, 2020, 6 pages.

ELECTRO-OPTIC MODULATOR AND METHODS OF USING AND MANUFACTURING SAME FOR THREE-DIMENSIONAL IMAGING

CROSS REFERENCE TO RELATED APPLICATIONS

This Application is a National Stage of International Application No. PCT/US2019/050696, filed Sep. 11, 2019, which claims the benefit of U.S. Provisional Patent Application No. 62/729,862, filed Sep. 11, 2018, the disclosures of both of which are hereby incorporated by reference herein in their entireties.

TECHNICAL FIELD

This disclosure relates generally to electro-optic modulators, light sensors, and LIDAR systems, particularly those usable for the generation of three-dimensional (3D) imaging data.

BACKGROUND

Capturing the three-dimensional (3D) position of surfaces and objects in a scene is on the verge of becoming a universal necessity for applications as diverse as coordinate measuring machining (CMM), robotic vision applications (RVA), autonomous vehicle applications (AVA), and even game console controls (virtual reality (VR) and augmented virtual reality (AVR)) to name just a few of the multitude of applications. An ideal 3D camera is able to capture the two-dimensional (2D) scene information as well as the scene distance information (z-axis or range information). A true 3D scene is generated using the 2D scene image information (this is the 2D information as captured in a conventional digital or film camera "picture") with the addition of the 1D distance of each object (or each pixel) in the 2D scene generates a complete 3D picture) along with video in high resolution in the same way 21) video cameras and cell phone cameras function today. For many applications, current approaches to accomplish this 3D scene generation suffer from serious weaknesses in resolution, operating range, SWaP (size, weight, and power), and cost.

Several technologies may be used to acquire 3D coordinates across a scene as an image. Each of these technological approaches have benefits, but also drawbacks and fundamental physics limitations that prevent them from delivering high quality 3D imaging and imaging as a function of time (e.g., real-time 3D video). Generally, these types of 3D systems can be broadly characterized as (A) stereoscopic, two image distance & correlation estimation, (B) FM modulated light distance estimation (C) projected light, holographic, or speckle correlated, distance estimation and (D) time-of flight imaging systems distance measurement systems.

Stereoscopic: One approach to low-cost 3D systems is the use of stereoscopic cameras that use multiple lenses and sensors separated by a baseline distance to provide computationally derived 3D information (similar to human binocular vision). The stereo images can be used to generate 3D geometry data using photogrammetry (triangulating the distance with corresponding pixels of the two sensors), but this requires precise calibration, a known mechanical volume for the baseline separation. These stereographic type systems are limited to short ranges relative to the baseline (the baseline is the distance between the two individual sensors). In addition, the 3D estimation is sensitive to lighting conditions and shadows. Such stereoscopic type devices do not operate well in dark or challenging lighting conditions and in-general require substantial computational resources that make extracting real-time 3D data difficult in small systems.

FM modulation: Another known distance estimating solution uses frequency modulated (FM) light for distance estimation, FM modulated light again may require a distinct transmitter and receiver aperture. These apertures must be precisely aligned and separated by sufficient distance for good distance performance. FM modulation systems do not necessarily provide more than a single pixel distance estimation. That is, this type of detector may be typically used for linear distance measurements for a single point. 3D measurements are performed by scanning each point in a scene to determine the distance between the sensor and object at each particular point. There is a need to overcome the point-by-point limitations of the FM modulation type of 3D instruments.

Projected Light: Another distance estimating solution projects light patterns onto the objects in the scene and uses a separate sensor to detect deviations in the pattern. Structured light projectors and image sensors use distinct transmit and receive apertures that are precisely aligned and separated by sufficient distance for good distance performance. These systems either use several patterns that limit the lateral resolution for range information or use multiple images that cannot be used for fast moving objects, There is a need to overcome the limitations of the projected-light type of 3D instrument.

Time-of-flight (TOF): TOF distance measurement systems use time-sensitive sensors that measure the time-of-flight for light to transit to the scene objects and return to the 3D camera sensors. Various techniques may be used to measure the time, but some involve circuitry in each pixel that control the response of the pixel and record the time of arrival (either by amplitude or phase) of the light for that pixel. The complexity of such circuitry as well as the extensive data that are recorded are drawbacks of such sensors, with even the most advanced time-sensitive sensors limited to 100-200 pixels on a side. Further scaling may require further costly chip development. These techniques are also sensitive to lighting conditions and have been, in some instances, limited to short distances and/or indoor ranges. For these solutions, each pixel must be timed precisely with respect to a master clock and with respect to each other to obtain satisfactory performance in range measurement, further complicating the ability to scale time-sensitive sensors, which may be used for coarse gesture recognition.

Some TOF systems require the use of two separate sensors or sensor systems, Which may require correlation between the object distance information and the image information. In such systems, one TOF sensor may have a resolution or pixel count that is typically substantially smaller than the second sensor (which creates the 2D image). One example of such a system is a moderate resolution 2D camera image correlated with a substantially lower resolution rotating 1D time-of-flight (TOF) distance measurement system. When 3D is created using two different sensor systems, the two different images, with the associated noise, must be correlated to each other, essentially by estimating important features between the low and high-resolution images and multiplexing the two images into a single 3D image or point cloud. This correlation results in the heavy use of computational processing resources and is prone to pixel-by-pixel errors. Thus, there is a need to overcome computational limitations and/or error issues of the dual-sensor TOF systems by obtaining both scene as well as distance from the same pixel on the same sensor.

SUMMARY

The innovative and improved electro-optic modulators and 3D sensors described in this disclosure overcome many of the aforementioned limitations of known 3D systems.

Ideally, a 3D camera is able to capture the 2D scene information as well as the scene distance information (z-axis). Disclosed herein are embodiments of a high dynamic range, compact, chip-scale, 3D imaging system and method that may include an electrically controlled electro-optic crystal, electro-optic ceramic, and/or an electro-optic polymer.

In accordance with an exemplary embodiment, a 3D imaging system includes a Fabry-Perot cavity having a first partially-reflective surface for receiving incident light and a second partially-reflective surface from which light exits. An electro-optic material is located within the Fabry-Perot cavity between the first and second partially-reflective surfaces. Transparent longitudinal electrodes or transverse electrodes produce an electric field within the electro-optic material. A voltage driver is configured to modulate, as a function of time, the electric field within the electro-optic material so that the incident light passing through the electro-optic material is modulated according to a modulation waveform. A light sensor receives modulated light that exits the second partially-reflective surface of the Fabry-Perot cavity and converts the light into electronic signals. Three-dimensional (3D) information regarding a scene-of-interest may be obtained from the electronic signals.

In accordance with another exemplary embodiment, a method of capturing 3D data includes the steps of: receiving incident light at a Fabry-Perot cavity having a first partially-reflective surface receiving the incident light and a second partially-reflective surface from which light exits; applying a voltage having a predetermined waveform to an electrode configured to produce an electric field within the electro-optic material so that the incident light passing through the electro-optic material is temporally modulated according to the predetermined modulation waveform; receiving light that exits the second partially-reflective surface of the Fabry-Perot cavity at a sensor; the sensor converting the received light into one or more electronic signals; and generating the 3D data based on the electronic signals.

The foregoing summary does not define the limits of the appended claims. Other aspects, embodiments, features, and advantages will be or will become apparent to one with skill in the art upon examination of the following figures and detailed description. It is intended that all such additional features, aspects, and advantages be included within this description and be protected by the accompanying claims.

BRIEF DESCRIPTION OF DRAWINGS

It is to be understood that the drawings are solely for purpose of illustration and do not define any limits. Furthermore, the components in the figures are not necessarily to scale. In the figures, like reference numerals designate corresponding parts throughout the different views.

DETAILED DESCRIPTION

Figure 1:
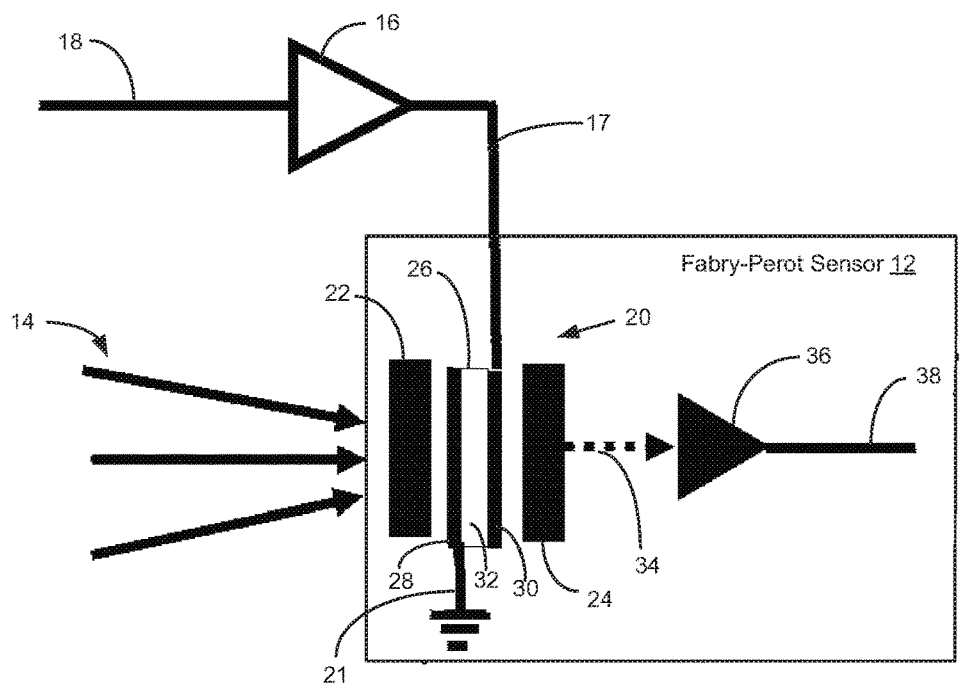
FIG. 1 is a schematic diagram illustrating a first example of a longitudinal electro-optic light sensor system including a Fabry-Perot cavity in front of a light sensitive detector.

The following detailed description, which references to and incorporates the drawings, describes and illustrates one or more examples of light modulators, sensors, systems and methods for 3D imaging and/or range detection. These examples, offered not to limit but only to exemplify and teach embodiments of the invention(s), are shown and described in sufficient detail to enable those skilled in the art to practice what is disclosed. Thus, where appropriate to avoid obscuring the invention, the description may omit certain information known to those of skill in the art. The disclosures herein are examples that should not be read to unduly limit the scope of any patent claims that may eventual be granted based on this application.

The word "exemplary" is used throughout this application to mean "serving as an example, instance, or illustration." Any system, method, device, technique, feature or the like described herein as "exemplary" is not necessarily to be construed as preferred or advantageous over other features.

As used in this specification and the appended claims, the singular forms "a," "an," and "the" include plural referents unless the content clearly dictates otherwise.

Also, the use of "or" means "and/or" unless stated otherwise. Similarly, "comprise," "comprises," "comprising" "include," "includes," and "including" are interchangeable and not intended to be limiting.

The innovative and improved 3D sensor systems described in this disclosure overcome many limitations of known 3D sensor systems, for example, the computational limitations and/or error issues of the dual-sensor TOF systems. The sensors disclosed herein may do this by obtaining both scene as well as distance from the same pixel(s) on the same sensor. Disclosed herein are examples of electro-optic phase modulators, and/or electrically tunable optically resonant cavities, and systems employing such modulators and electrically tunable cavities and the means to electrically stimulate optical modulation or optical switching through the use of the polymeric, crystalline, polycrystalline, or ceramic electro-optic thin films in said modulator, and the means of fabricating such devices.

As laser TOF (time-of-flight), laser-based projection, laser-based FM modulation, and laser-based optical automotive sources (such as automotive laser based "high beams") become more prevalent, 3D cameras/scene generators should have improved resilience to interference from the potential interfering light sources from non-3D based camera systems, as well as being immune from interference with each other. The methods, apparatuses, and systems disclosed herein, which may incorporate an electrically controlled electro-optic crystal, electro-optic ceramic, or electro-optic polymer greatly reduce the possibility of interference, due to the limit of timing coincidence of the potential interfering laser sources.

The systems disclosed herein may include an active time-multiplexing arrangement, whereby timed illumination sources are timed and synchronized with electrically activated sensors.

FIG. 1 is a schematic diagram illustrating an example of an electro-optic light modulator system 10 that includes a Fabry-Perot sensor 12 and a voltage driver circuit 16. The sensor 12 may receive incident light 14, which may be portions of returned light that is scattered or reflected from a scene-of-interest. The sensor 12 outputs one or more electronic signals 38, from which 3D information may derived regarding the scene by a processor subsystem (not shown).

The voltage driver 16 provides a predefined electrical modulation waveform signal 17 to the sensor 12. The waveform signal 17 may have time varying voltage and is generated by the voltage driver 16 in response to a control signal 18. The waveform may be a voltage ramp, square wave, sinusoidal wave, saw tooth, sigmoidal, continuous, discontinuous, or any other suitable voltage waveform for modulating incident light 14 passing into the sensor. The characteristics of the signal 17, e.g., voltage, current, timing, and the like, may be configured to any suitable values based on the requirements of the desired modulation of the incident light 14 and of the electro-optic modulator in the Fabry-Perot sensor 12. The control signal 18 may be generated by a processor subsystem (not shown) under the control of a processor.

The processor subsystem may include one or more processors coupled to a memory. The functions of the processor subsystem may be implemented in hardware, software, firmware, or any suitable combination thereof. If implemented in software, the functions may be stored as one or more instructions or code on a computer-readable medium (e.g., memory) and executed by a hardware-based processing unit (e.g., a processor Computer-readable media may include any computer-readable storage media, including data storage media, which may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disc storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The processor may include one or more processors for executing instructions or code, such as one or more digital signal processors (DSPs), general purpose microprocessors, application specific integrated circuits (ASICs), field programmable logic arrays (FPGAs), or other equivalent integrated or discrete logic circuitry. The memory and processor may be combined as a single chip. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits, including logic circuits and/or logic elements.

The Fabry-Perot sensor 12 includes a Fabry-Perot cavity (FPC) 20, which acts as a light modulator, in front of a light sensitive detector 36. The FPC 20 includes a first partially reflective mirror 22 for receiving incident light 14, a second partially reflective mirror 24 from which light may exit, and an electro-optic modulator (EOM) 26 located between the first and second mirror 22, 24. The EOM 26 includes a first electrode 30, a second electrode 28, and electro-optic material 32 sandwiched between the electrodes 28, 30.

The FPC 20 is configured in a "longitudinal" configuration. "Longitudinal" refers to the placement of the electrodes 28, 30 relative to the path of the light 14, 34. In the longitudinal configuration, the applied electric field (perpendicular to the electrodes 28, 30), is in the same direction as the light propagation through the FPC 20. The electro-optic material 32 consists of an electro-optic polymer, an electro-optic crystal, or an electro-optic ceramic, or any suitable combination of the foregoing, and may include any of the materials disclosed herein, described in greater detail below. The applied voltage 17 may be, for example, as a voltage ramp connected to the first electrode 30, while the second electrode 28 is connected to ground 21. The transmission of light 14 entering from the left is modulated by the FPC 20, according to the applied voltage 17, allowing light to proceed through the cavity mirrors 22, 24 onto the light sensitive detector 36 on the right. Thus, light transmission through the FPC 20 is dependent on the voltage waveform applied to the EOM 26.

The applied voltage is exemplarily described as a voltage ramp connected to the first electrode 30, while the second electrode 28 is connected to ground. The use of "voltage ramp" or "ground" is only an illustrative example. A differential applied voltage, between the first and second electrodes 28, 30 may also be used for light modulation.

In the longitudinal configuration the Fabry-Perot minors 22, 24 may be separate from the electrodes 28, 30, or alternatively, may simultaneously serve the function of both the mirrors 22, 24 as well as the electro-optic switch electrodes 28, 30. That is, the Fabry-Perot mirrors 22, 24 and electrodes 28, 30 may be one and the same in some embodiments.

The longitudinal electrodes 28, 30 may be transparent electrodes, for example, ITO, a conductor grid, such as gold or aluminum, or the like.

The light detector 36 may be a single pixel detector, such as a commercially available CCD or CMOS detectors. The electronic signals 38 output from the detector 36 may be collected by the processor subsystem and processed by the subsystem to derive 3D data regarding the scene.

Figure 2:
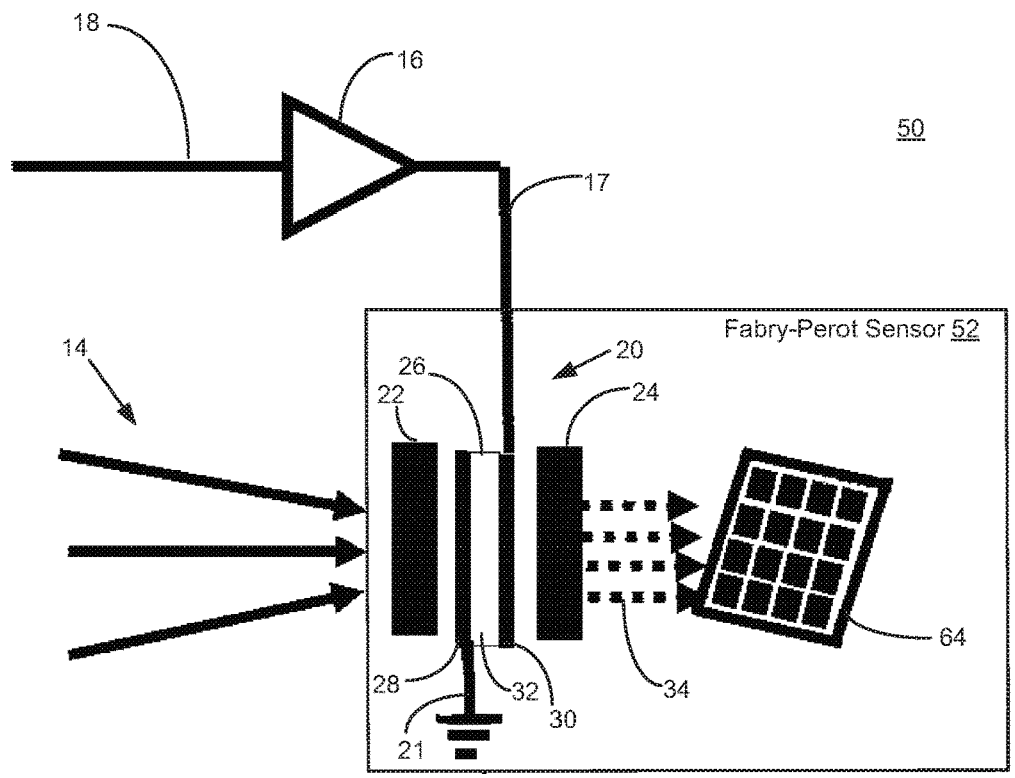
FIG. 2 is a schematic diagram illustrating a second example of a longitudinal electro-optic light sensor system including a Fabry-Perot cavity in front of a light sensitive detector.

FIG. 2 is a schematic diagram illustrating another example of an electro-optic light modulator system 50 that includes a Fabry-Perot sensor 52 and the voltage driver circuit 16. Like sensor 12 of FIG. 1, the sensor 52 may receive incident light 14, which may be portions of returned light that is scattered or reflected from a scene-of-interest. However, in contrast to the sensor 12 of FIG. 1, the sensor 52 outputs one or more electronic signals from a sensor array 64, from which 3D information may derived regarding the scene by the processor subsystem (not shown).

In this example implementation, the light sensitive detector pixel 36 of FIG. 1 has been replaced by a light sensitive array 64. Such an array 64 may include, as an example, a commercially-available CCD light sensitive array, a CMOS light sensitive array, a series of photodetectors arranged in a 2-dimensional array, or the like. Generally, the array 64 includes an array of pixels, where each pixel can determine the intensity of received light thereon. The array 64 may include any suitable number of pixels, and contemporary sensors often include millions of pixels. The electronic signals output from the array 64 may be collected by the processor subsystem and processed by the subsystem to derive 3D data regarding the scene.

Figure 3:
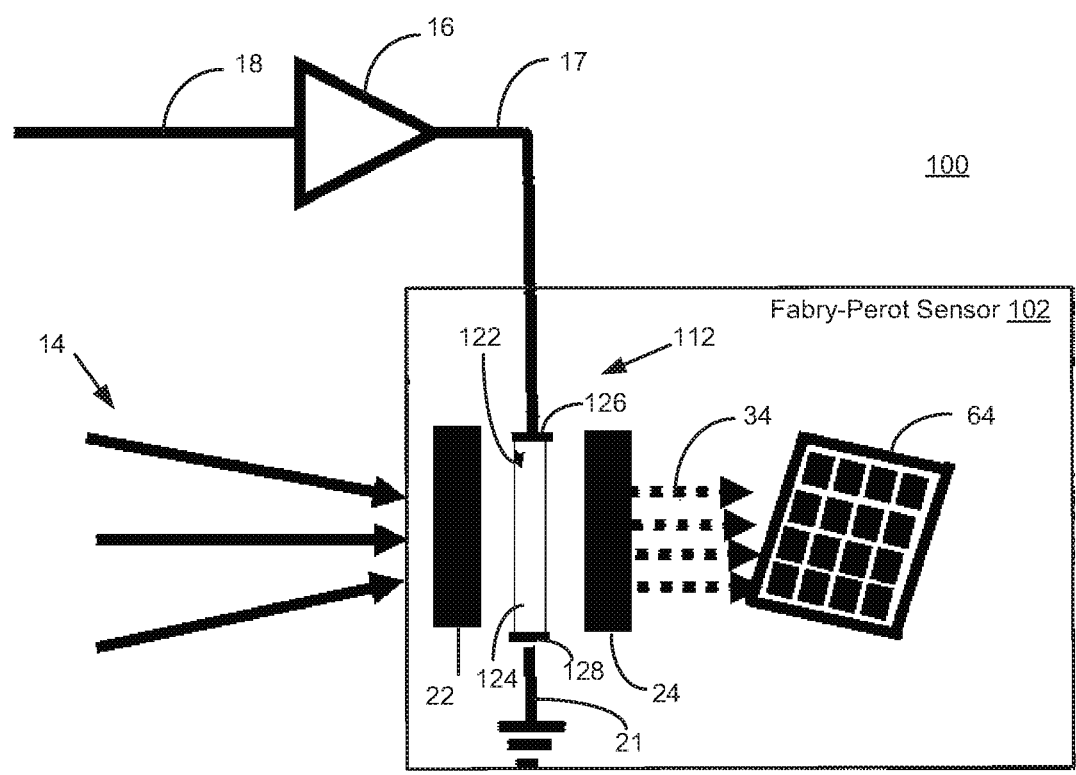
FIG. 3 is a schematic diagram illustrating a first example of a transverse electro-optic light sensor system including a Fabry-Perot cavity in front of a light sensitive detector.

FIG. 3 is a schematic diagram illustrating another example configuration of an electro-optic light modulator system 100 that includes a Fabry-Perot sensor 102 and the voltage driver circuit 16. Like sensor 52 of FIG. 2, the sensor 102 may receive incident light 14, which may be portions of returned light that is scattered or reflected from a scene-of-interest. However, in contrast to the sensor 52 of FIG. 2, the sensor 102 includes an EOM 122 configured in a "transverse" configuration. "Transverse" refers to the placement of the electrodes 126, 128 relative to the path of the light. In the transverse configuration, the applied electric field (perpendicular to the electrodes 126, 128), is in the orthogonal direction as compared to the direction of light propagation through the EOM 122.

The sensor 102 includes an FPC 112 in front of the light sensitive detector array 64. The FPC 112 includes an EOM 122 between the two mirrors 22, 24. The EOM 122 includes first or top electrode 126, second or bottom electrode 128, and electro-optic material 124 therebetween. The electro-optic material 124 may comprise an electro-optic polymer, an electro-optic crystal, or an electro-optic ceramic, or any suitable combination of the foregoing, such as any of those disclosed herein.

The applied voltage 17 may be any of the waveforms described above, including a voltage ramp connected to the first electrode 126, while the second electrode 128 is connected to ground 21. The transmission of light entering from the left is modulated by the EOM 122 via the applied voltage waveform 17, allowing light to proceed through the cavity mirrors onto the light sensitive detector (single pixel, not shown) or light sensitive array 64 on the right. The Fabry-Perot mirrors 22, 24 are separate from the electrodes 126, 128 in the transverse configuration.

Alternatively, a differential voltage waveform may be applied to the electrodes 126, 128, as described above in connection with FIG. 1.

Figure 4:
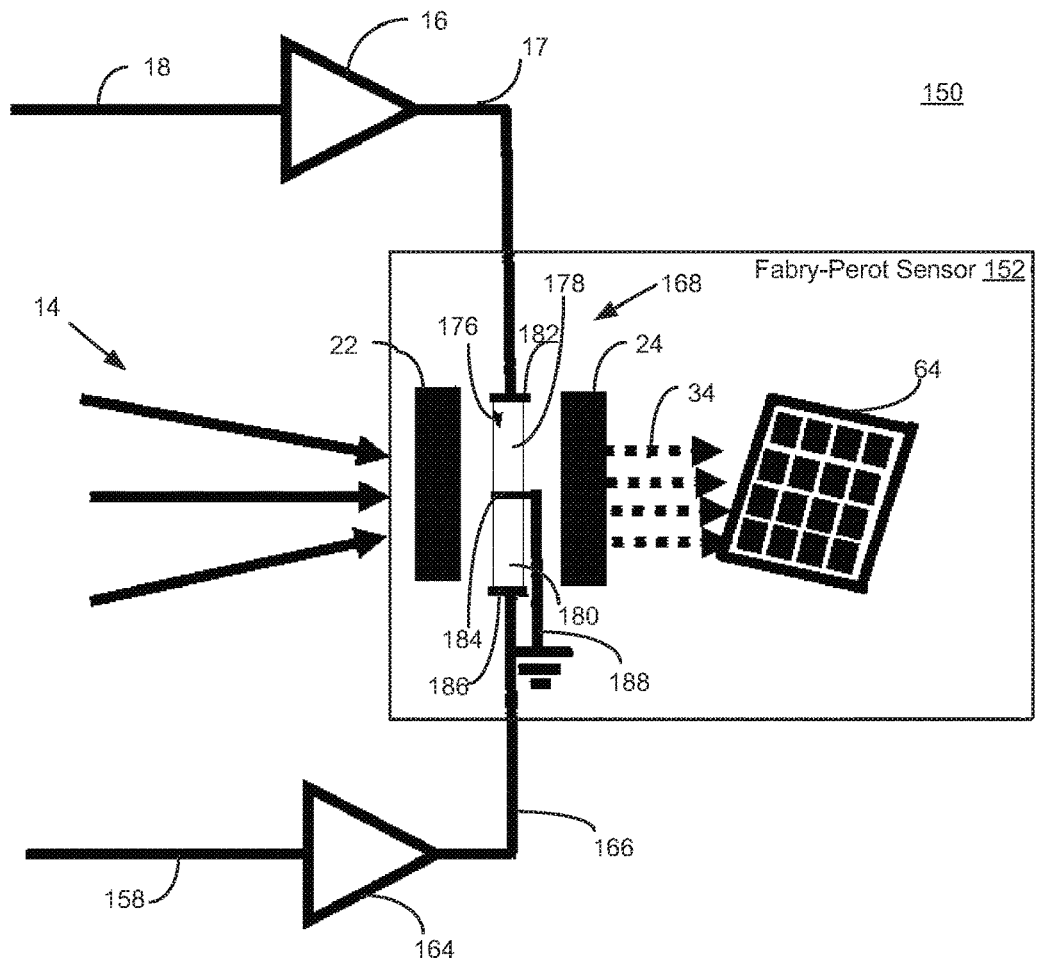
FIG. 4 is a schematic diagram illustrating a second example of a transverse electro-optic light sensor system including a Fabry-Perot cavity in front of a light sensitive detector.

FIG. 4 is a schematic diagram illustrating another example configuration of an electro-optic light modulator system 150 that includes a Fabry-Perot sensor 152 and the voltage driver circuit 16 and a second voltage driver circuit 164. Like sensor 102 of FIG. 3, the sensor 152 may receive incident light 14, which may be portions of returned light that is scattered or reflected from a scene-of-interest.

The sensor 152 includes and FPC 168 placed in front of the light detector array 64. The FPC 168 includes first and second mirrors 22, 24 and a segmented transverse EOM 176 located between the mirrors 22, 24. The EOM 176 includes top electrode 182, center electrode 184, bottom electrode 186, electro-optic material 178 located between first and second electrodes 182, 184, and electro-optic material 180 located between second and third electrodes 184, 186.

The electro-optic materials 178, 180 may include an electro-optic polymer, an electro-optic crystal, or an electro-optic ceramic, or any suitable combination of the foregoing, such as any of those disclosed herein.

The additional center electrode 184 may be located at or near the center of the EOM 176. In some embodiments, the center electrode 184 may be located elsewhere, away from the center of the EOM 176. In this particular example, the applied voltage 166 from driver circuit 164 is connected to the bottom electrode 186. The voltage waveform 166 output from the driver 164 may be any of those waveforms described above for voltage driver 16. The voltage waveform 166 may be generated in response to the second control signal 158 from the processor subsystem (not shown). The second control signal 158 may be produced by the processor subsystem in a manner similar to that described in connection with FIG. 1 for signal 18. In some embodiments, signal 158 may be independent of signal 18. In some embodiments, signal 158 may be synchronized with signal 18.

In some embodiments, the center electrode 184 may be connected to ground 188, as shown.

To form the center electrode 184 in the electro-optic material, the center electrode 184 may include a small groove, for example, microns in width that has been cut or otherwise placed in the center of the electro-optic material, thus forming the two segments 178, 180. The groove may have conductive electrodes forming the center electrode 184, such as sputtered gold, as an example, placed in the groove.

A differential voltage may be applied between the center, top, and bottom electrodes 182, 184, 186. The applied voltage may be, for example, a voltage ramp connected to the bottom electrode 186, a second voltage ramp applied to the top electrode 182, and a third voltage ramp applied to the center electrode 184. The transmission of light entering from the left is modulated by the applied voltages, allowing light to proceed through the cavity mirrors onto the light sensitive detector 64 on the right. The Fabry-Perot mirrors 22, 24 are separate from the electrodes in the transverse configuration.

Although the sensor 152 is shown having three electrodes 182, 184, 186 in the EOM 176, in some embodiments more than three electrodes may be used, for example, four or more electrodes may be used, or hundreds or thousands of electrodes may be used in some embodiments. Additional voltage driver circuit (more than two), for example, hundreds or thousands of driver circuits, may be included in some embodiments.

Figure 5:
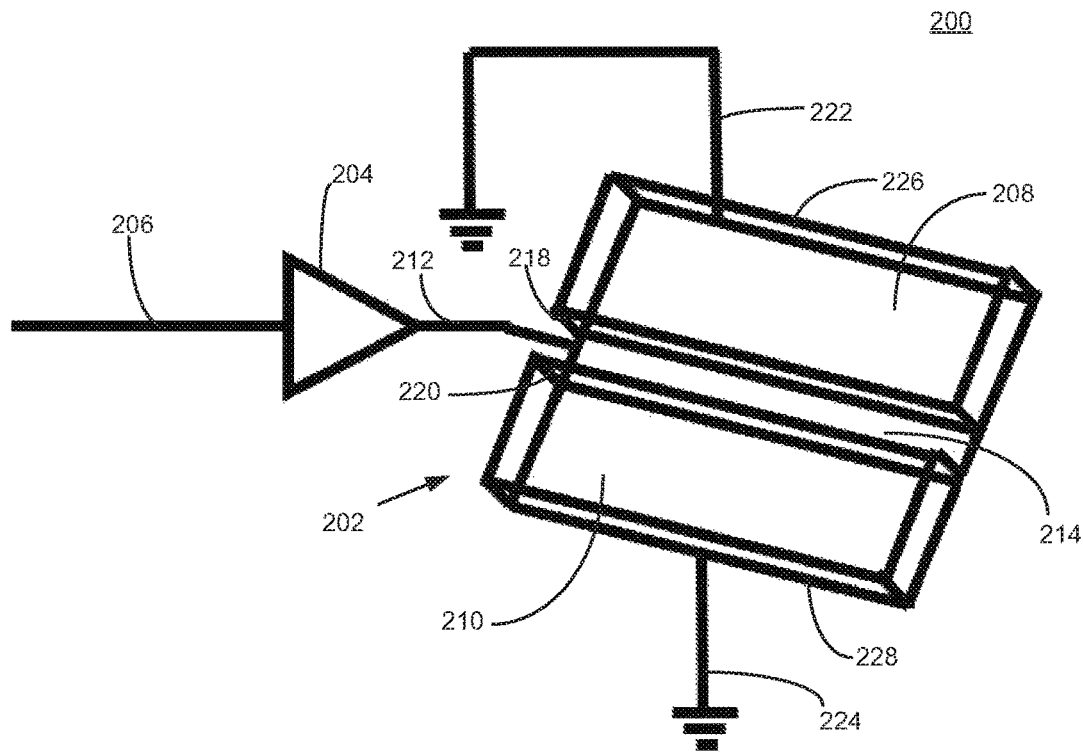
FIG. 5 is a perspective-view schematic diagram illustrating an example transverse electro-optic light modulator (EOM).

FIG. 5 is a perspective view schematic diagram illustrating an example configuration of system 200 having a segmented, transverse electro-optic light modulator 202 connected to driver circuit 204. In some embodiments, the EOM 202 may be substituted as the EOM in any of the Fabry-Perot sensors shown in FIGS. 3-4 and 8. The driver circuit 204 may produce an EOM voltage modulation waveform 212 in response to a control signal 206 in a manner similar to that described above for driver circuit 16.

The EOM 202 includes a first segment of electro-optic material 208 and a second segment of electro-optic material 210. The electro-optical materials 208, 210 are shown as being rectangular in shape, but may have any other suitable shape, such as a square. The materials 208, 210 may each include an electro-optic polymer, an electro-optic crystal, or an electro-optic ceramic, or any suitable combination of the foregoing, such as any of those disclosed herein. The EOM 202 is configured in a transverse configuration, as described above.

A top electrode 226 is formed on the top surface of material 208 and connected to ground 222, in the example. A bottom electrode 228 is formed on the bottom surface of material 210 and connected to ground 224, in the example.

An additional center electrode 214 may be placed in the center of the EOM segments 208, 210. In this particular example, the applied voltage ramp 212 is connected to the center electrode 214. This electrode 214 may include a small groove, e.g., microns in width that has been cut or otherwise placed in or near the center of the electro-optic material. The groove may be etched using available semiconductor processing techniques. The groove has walls 218 and 220 that form conductive transverse electrodes on the sides of the groove. A conductor, such as sputtered gold, as one example, may be placed in the groove to cover the floor and walls 218, 220, whereby forming the transverse center electrode 214. Other conductors, such as a metal, for example, copper or aluminum may be used in some embodiments. Other embodiments may not use a groove, but instead a small strip of conductive metal placed on surface of the electro-optic material.

A differential voltage may applied between the center, top and bottom electrodes of the EOM 202. The applied voltage may be, for example, as a voltage ramp connected to the center electrode 214, and grounding at the top and bottom electrodes 226, 228, as shown. Other voltages may be applied to any of the electrodes 214, 226, 228. For example, a second voltage ramp may be applied to the topmost electrode 226, and a third voltage ramp may be applied to the bottom-most electrode 228. The purpose of the center electrode is to allow the application of a differential voltage between the top, the center, and the bottom electrodes. In some embodiments, the differential voltages applied across the segments 208, 210 may be independent of each other.

Figure 6:
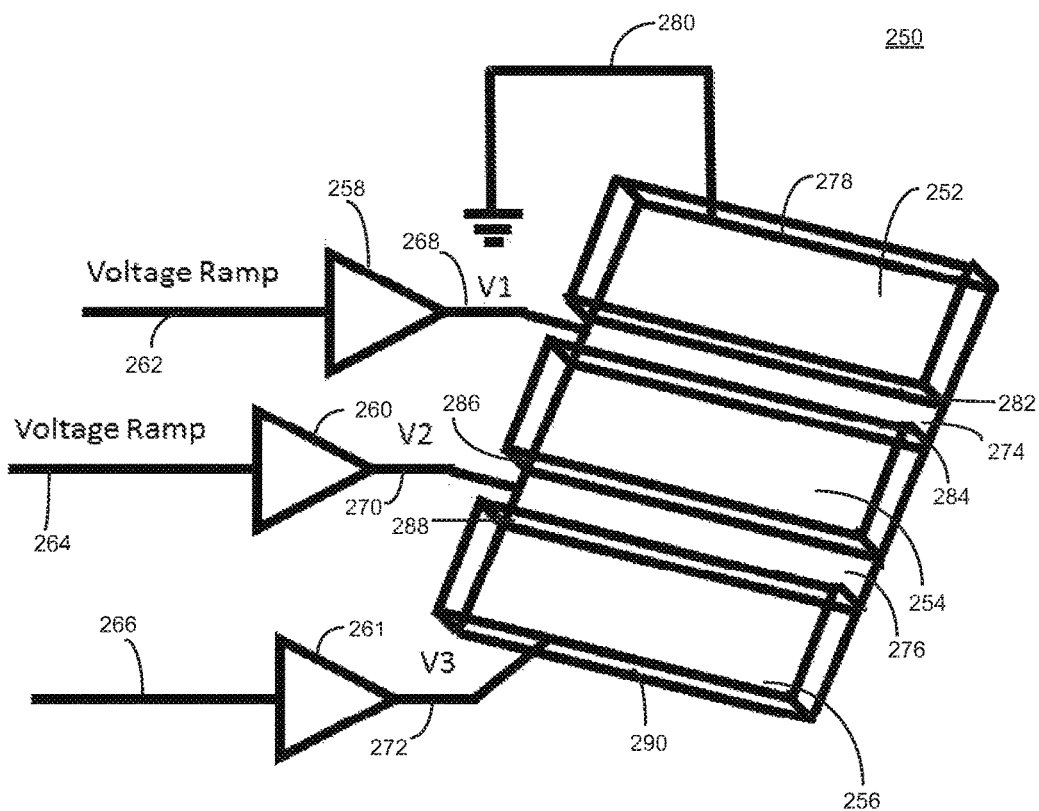
FIG. 6 is a perspective-view schematic diagram illustrating another example of a transverse electro-optic light modulator (EOM).

FIG. 6 is a perspective view schematic diagram illustrating an alternate example configuration of a transverse electro-optic light modulator (EOM) 250 coupled to multiple voltage driver circuits 258, 260, 261. In some embodiments, the EOM 250 may be substituted as the EOM in any of the Fabry-Perot sensors shown in FIGS. 3-4 and 8. The driver circuits 258, 260, 261 may produce EOM voltage modulation waveforms V1, V2, V3 268, 270, 272, respectively, in response to control signals 262, 264, 266, respectively, in a manner similar to that described above for driver circuits 16 and 164.

The EOM 250 is configured in a "transverse" configuration. "Transverse" refers to the placement of the electrodes relative to the path of the light, as described above. The electro-optic material may include an electro-optic polymer, an electro-optic crystal, or an electro-optic ceramic or any suitable combination of the foregoing, such as any of those disclosed herein.

In comparison to the EOM 202 of FIG. 5, further additional electrodes are placed in the electro-optic material. In this particular example, two electrode grooves 274, 276 are formed in the electro-optic material, separating the material into segments 252, 254, 256.

A top electrode 278 formed on the top surface of the top material segment 252 may be connected to ground 280, as shown, or in some embodiments, to another voltage driver circuit. Additional voltage ramps V1, V2, V3 may be applied relative to the top electrode 278, the second electrode 274, the third electrode 276, and the bottom electrode 290, respectively.

Each of the center electrodes 274, 276 may include a small groove, e.g., microns in width that has been cut or otherwise placed in the electro-optic material. Other implementations might not require a groove, but instead a small strip of conductive metal placed on the surface of the electro-optic material. The strips or grooves form conductive electrodes, and may be formed using a sputter metallic conductor, such as sputtered gold, for example, placed in the groove or on the surface of the electro-optic material.

The grooves may be etched using available semiconductor processing techniques. Each groove has walls 282, 284 and 286, 288, respectively, that form conductive transverse electrodes on the sides of the grooves. A conductor, such as sputtered gold, as one example, may be placed in the groove to cover the floors and walls 282, 284 and 286, 288, whereby forming the transverse center electrodes 274, 276.

Differential voltages may be applied between the electrodes 278, 274, 276, 290. The applied voltage is shown, for example, as voltage ramps V1, V2, V3 connected to the second, third, and bottom electrodes, respectively. The purpose of the electrode grooves is to allow the application of differential voltages between the top, the center, and the bottom electrodes. Other voltages may be applied to any of the electrodes 278, 274, 276, 290. In some embodiments, the differential voltages applied across the segments may be independent of each other.

The segmented EOMs disclosed herein are not limited to two or three segments, as shown in FIGS. 5 and 6. In some embodiments, a segmented EOM may include many more segments, for example, hundreds, thousands or millions of segments. Also, in some embodiments, the EOM segments may be arranged in a two-dimensional array, rather than the example 1D segment arrays shown in FIGS. 5 and 6.

Figure 7:
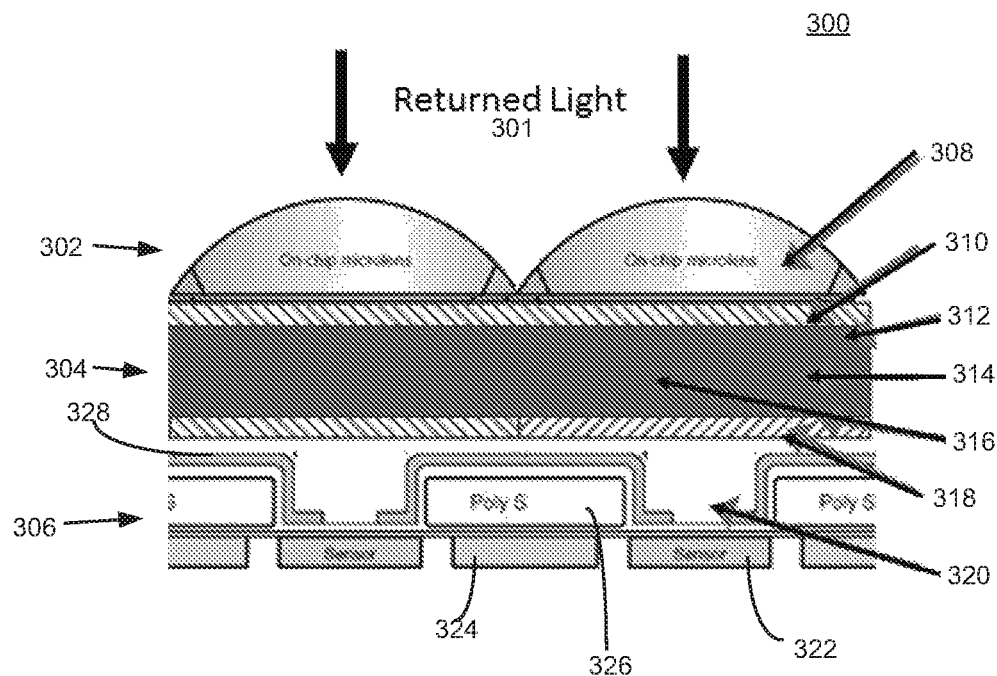
FIG. 7 is a cross-sectional side view of an exemplary integrated longitudinal electro-optic light sensor including a Fabry-Perot cavity in front of a light sensitive detector array.

FIG. 7 is a cross-sectional side view of another example of an integrated longitudinal electro-optic light sensor 300 including a Fabry-Perot cavity 304 in front of a light sensitive detector array 306. The sensor 300 may be a monolithic sensor. Returned light or incident light 301 from the top is collected by a microlens array 302 having a multitude of microlenses 308.

The Fabry-Perot cavity 304 consist of a top reflective coating 310, a transparent conductor coating 312, such as an ITO coating, an electro-optic (EO) material 314 (e.g., an electro-optic polymer (EOP), electro-optic crystal (EOC), electro-optic ceramic (EOCe), or the like, such as any of those disclosed herein), a bottom transparent conductor coating 316, such as an ITO coating, and bottom reflective coating 318.

The sensor array 306 may include a semiconductor substrate supporting an array of pixel sensors 322 located in respective wells 320 insolated by optically opaque shielding 328, Which may be a dielectric layer such as an oxide, to avoid optical cross-talk. Polysilicon layer 326 and conductor layer 324 may provide electronic signal paths to and from the sensors 322.

Voltage may be applied across the EO coatings 312, 316 in a precise time-varying manner to allow transmission of light to the sensor array 206 (e.g., CMOS, CCD, or other type of sensor array) through the FPC 304 in a manner precise to the operation of the system. This electrically modulated light enables the determination of distance, in addition to collecting the overall image of the scene. The reflective coatings 310, 318 and the conductive coatings 312, 316 may combined, respectively. In this case, the electrically conductive coating consists of ITO (indium-tin-oxide). Other electrically conductive coatings can also be used. The electro-optic modulator is configured in a "longitudinal" configuration. As described above, "longitudinal" refers to the placement of the electrodes relative to the path of the light. In the longitudinal configuration, the applied electric field (perpendicular to the electrodes), is in the same direction as the light propagation (from top to sensor). The electro-optic material may comprise an electro-optic polymer, an electro-optic crystal, or an electro-optic ceramic, or any suitable combination of the foregoing, such as any of those disclosed elsewhere herein.

Figure 8:
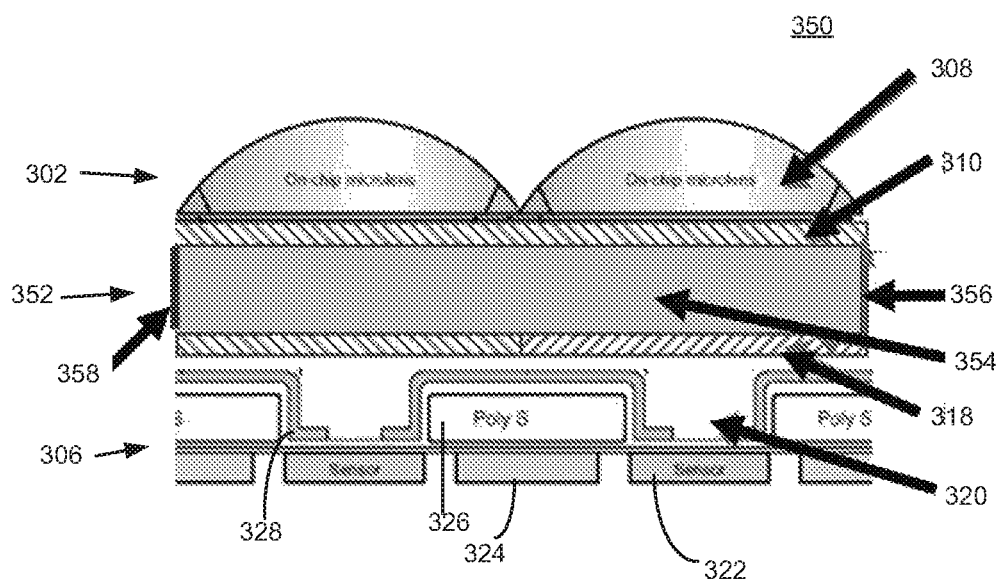
FIG. 8 is a cross-sectional side view of an exemplary integrated transverse electro-optic light sensor including a Fabry-Perot cavity in front of a light sensitive detector array.

FIG. 8 is a cross-sectional side view of an example of an integrated transverse electro-optic light sensor 350 including a Fabry-Perot cavity 352 in front of a light sensitive detector array 306. The sensor 350 may be a monolithic sensor. Incident light from the top is collected by a microlens array 302. The Fabry-Perot cavity 352 includes a top reflective coating 310, an electro-optic material 354 (EOP, EOC, EOCe, or the like), and a bottom reflective coating 318.

The FPC 352 includes at least two electrodes 356, 358 for producing an electric field through the electro-optic material 354 located therebetween. The electrode configuration is perpendicular or "transverse" to the light propagation. In some embodiments, the electro-optic material 354 may be segmented and a multitude of transverse electrodes with different voltage drivers may be used. The electrically conductive electrodes 256, 358 may include ITO (indium-tin-oxide) or any other suitable electrically conductive material such as any of the metallic conductor disclosed herein.

Voltage may by applied across the electrodes 356, 358 in a precise manner to allow transmission of light through the FPC 352 to the sensor array 306 (CMOS, CCD, or other type of sensor array) in a manner precise to the operation of the system. This electrically modulated light enables the determination of distance, in addition to collecting the overall image of the scene. The applied voltage may, for example, be a voltage ramp connected to one electrode 358, while the other electrode 356 is connected to ground. In the transverse configuration, more than two electrodes may be employed. The electrodes 356, 358 may consist of thin conductive layers applied between segments of EO material, or conductive materials in grooves between EO material layers, or conductor strips on the top and bottom surfaces of the EO material 354.

The electro-optic material 354 may include an electro-optic polymer, an electro-optic crystal, or an electro-optic ceramic, or any suitable combination of the foregoing, such as any of those disclosed herein.

In some embodiments, each of the sensors 300, 350 of FIGS. 7 and 8 may be connected to the processor subsystem disclosed herein and appropriate voltage driver circuit(s), as described in connection with FIGS. 1-4, to control modulation of the incident light via the FPCs 304, 352, respectively, and to also process electronic signals output from the sensor array 306 to derive 3D information.

In some embodiments of the FPCs described herein, the electrodes and electrode conductive layers are approximately index-matched to the EO material such that the index does not vary by more than 0.0001, or by more than 0.001, or by more than 0.01. In some embodiments of the FPCs described herein, the refractive indices of the materials (EO material and conductive materials) are not matched.

Figure 9:
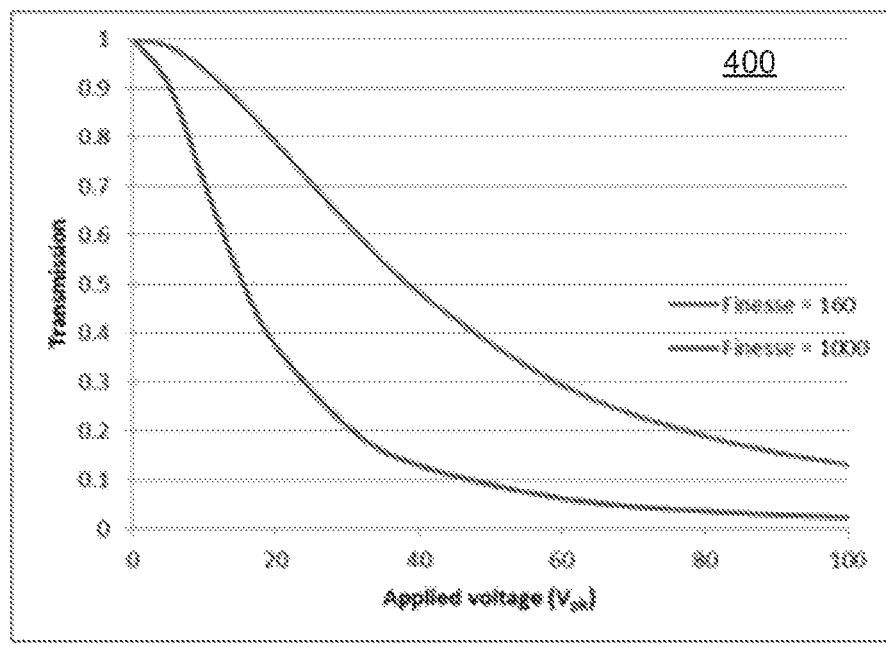
FIG. 9 shows a graph illustrating light transmission of exemplary low finesse and high finesse Fabry-Perot cavities as a function of voltage.

FIG. 9 shows a graph 400 illustrating exemplary light transmission of a "low finesse" Fabry-Perot cavity and a "high finesse" Fabry-Perot cavity as a function of voltage. The graph shows an advantage of using FPC modulators: with a relatively low voltage, which may depend upon the specific configuration of the electrodes, electro-optic material, and thickness, high contrast transmission (e.g., 80% or more) can be achieved even with a low finesse cavity with relatively low applied driving voltage.

Figure 10:
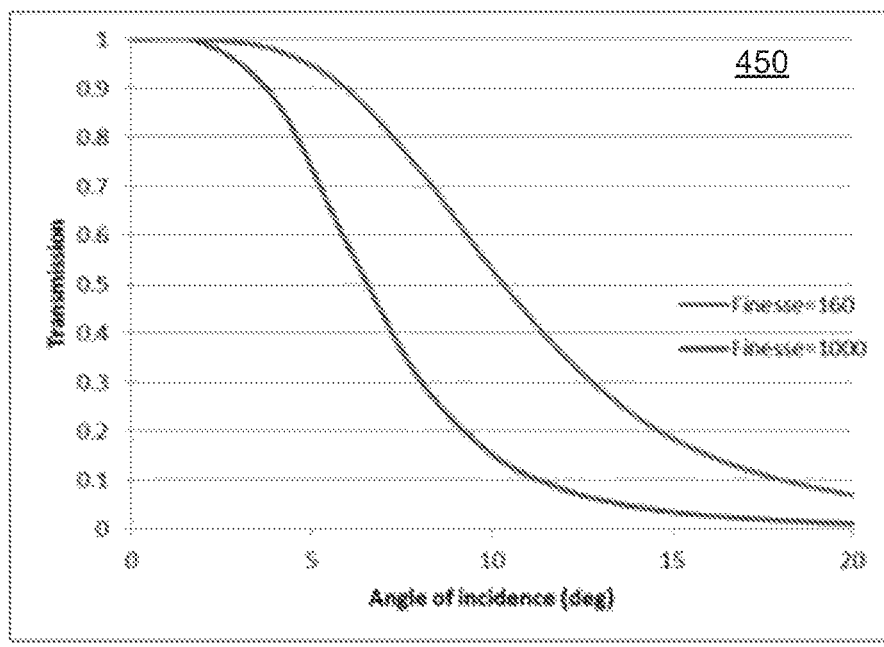
FIG. 10 shows a graph illustrating light transmission, as a function of light incident angle, of exemplary low finesse and high finesse Fabry-Perot cavities.

FIG. 10 shows a graph 450 illustrating exemplary light transmission, as a function of light incident angle, of a "low finesse" Fabry-Perot cavity and a "high finesse" Fabry-Perot cavity. The transmission may depend upon the specific configuration of the electrodes, electro-optic material, and thickness. However, in this particular configuration, high contrast transmission (e.g., 80%) may be achieved even with a low finesse cavity at relatively low angles of incidence.

Figure 11:
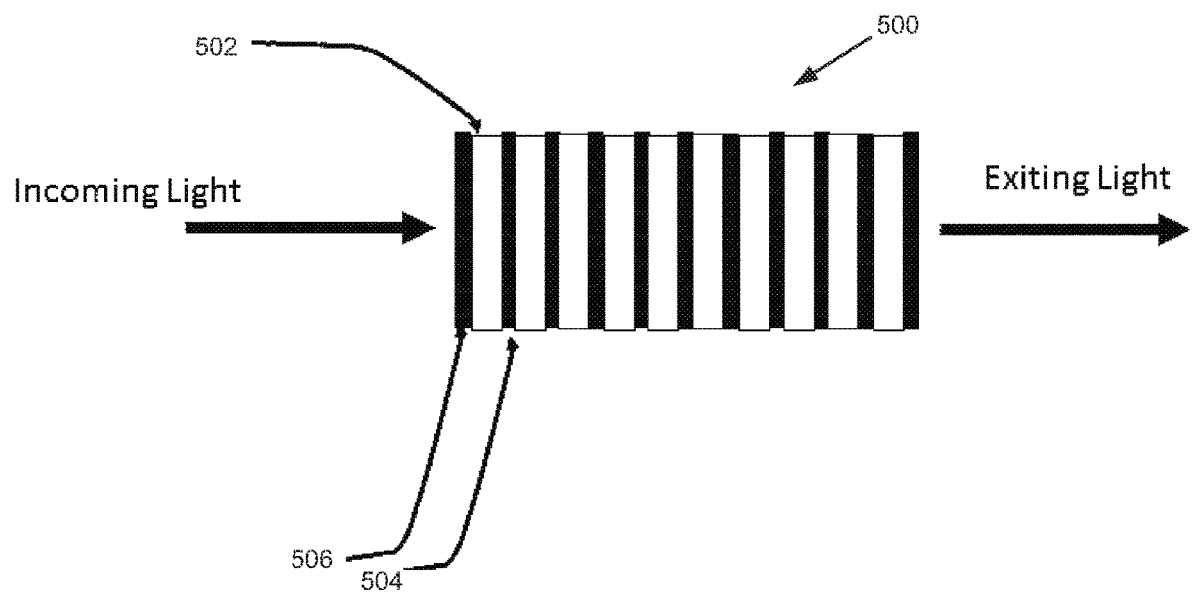
FIG. 11 is a cross-sectional schematic view of an example longitudinal electro-optic modulator, such as a Pockets cell.

FIG. 11 is a cross-sectional schematic view of another exemplary longitudinal electro-optic modulator (EOM) 500, such as a Pockets cell. The EOM 500 includes ten waters of EO material 502 sandwiched between eleven transparent electrodes 504, 506. The transparent electrodes 504, 506 can be any of the transparent electrode materials disclosed herein. Drive voltages may be applied to each of the electrodes 504, 506.

The EO material 502 can be crystalline materials or poled crystalline ceramics (EO and EOCe) used in thin wafers forming the longitudinal EOM 500. To reduce the drive voltage, a modulating layer can be formed using a series of longitudinal Pockets cells stacked together as shown in FIG. 11, For example, a series of ten wafers, each wafer being of 0.5 mm thickness of an electro-optic material such as potassium dideuterium phosphate (KD*P) can be fabricated such that the half-wave (100% contrast between on and off states) voltage of 320 V at 532 nm. Other crystal thicknesses and number of layers can be used. For example, EO material wafer layers or 0.2 mm or less or less than 2 mm can be used. Other crystalline electro-optic materials such as lithium niobate can be used instead, as well as other voltages, waveforms, and crystal thicknesses.

One way of assembling this kind of stack 500 is to deposit the transparent electrodes such as indium tin oxide (ITO) on substrates of a birefringence compensation material such as magnesium fluoride ($MgF_2$) and sandwich the electro-optic material. This results in a layered structure of $MgF_2$-ITO-EO-ITO-$MgF_2$, which can be repeated, if needed, to form a stacked longitudinal Pockels cell that is then compensated for birefringence. The stacked modulator 500 illustrated in FIG. 11 may comprise any suitable number of electrode-crystal sandwiches.

The optic axes of the different crystal wafers may be aligned to within 0.5°. In some embodiments, the optic axes can be aligned to within 1°, or within 2°, or larger. The voltage can be applied in parallel across each crystal element by supplying alternating electrodes with the same voltage signal. These elements can be made most compact by proper insulation and mechanical mounting, including placing electrode contacts such that voltage is applied to every other electrode or other patterns as is suitable. Even for stack assemblies comprised of a single crystal, the assembly will be most compact if the birefringent compensating material is used as the windows for the assembly (e.g., located outside the electric field caused by the transparent electrodes) with the transparent electrodes deposited on the compensating material or on the modulator material.

A stack modulator, e.g., modulator 500 shown in FIG. 11, can be placed in front of a light detector array, for example, the array 64 as illustrated in FIG. 2 for a longitudinal electro-optic modulator, or array 64 of FIG. 3 for a transverse modulator, or alternatively, it may be integrated between the microlens array 302 and the sensor array 306, substituting for the FPCs 304 and 352, illustrated in FIG. 7 for a longitudinal electro-optic sensor and FIG. 8 for a transverse electro-optic sensor.

In some embodiments, the stack 500 may be used as a phase modulator of the Fabry-Perot cavity of the systems depicted in FIGS. 1-4 and 7-8. The stack can also be used for sensor arrays that do not use microlens array and for other sensor array configurations such as backside illuminated sensors.

Figure 12:
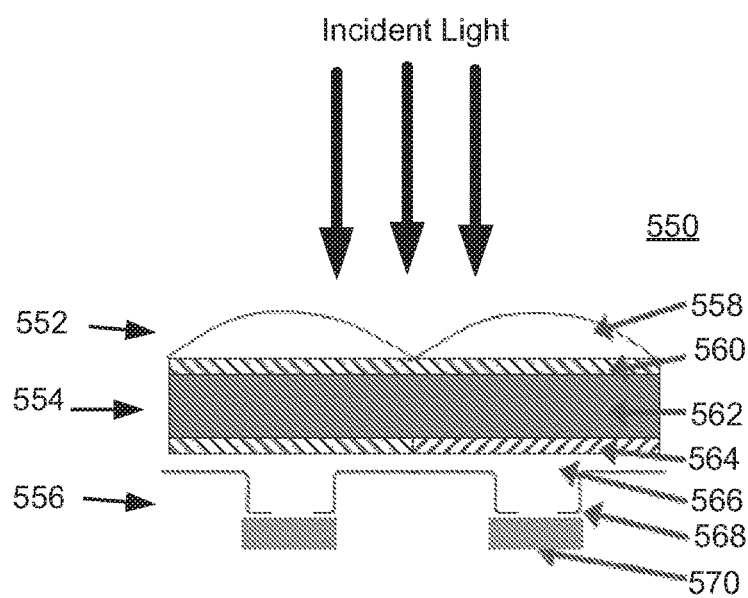
FIG. 12 is a cross-sectional schematic view of an example monolithic sensor with a longitudinal modulator formed below or behind a microlens array.

FIG. 12 is a cross-sectional schematic view of an example monolithic sensor 550 with a longitudinal modulator 554 formed below or behind a microlens array 552 having plural microlenses 558. The modulator 554 is located in front of a light sensitive detector array 556. Returned light or incident light from the top is collected by a microlens array 552.

The modulator 554 can be any of the polarization modulators disclosed herein, or alternatively/additionally it may include the any of the disclosed Fabry-Perot type modulators where the polarizer layers shown in FIG. 12 are replaced by reflective or partially reflectively layers or coatings as shown in the other drawings herein. The disclosed transverse modulators may likewise be located in front of or in back of the microlens array 552.

For example, in some embodiments, the modulator layer 554 includes a Fabry-Perot cavity consisting of a top reflective coating combined with a transparent conductor 560, an electro-optic (EO) material 562 (e.g., an electro-optic polymer (EOP), electro-optic crystal (EOC), electro-optic ceramic (EOCe), or the like, such as any of those disclosed herein), a bottom transparent conductor combined as a bottom reflective coating 564.

The sensor array 556 may include a semiconductor substrate supporting an array of pixel sensors 570 located in respective wells 566 insolated by optically opaque shielding 568, which may be a dielectric layer such as an oxide, to avoid optical cross-talk. The sensor array may be a commercially-available CCD or CMOS light sensor array.

Figure 13:
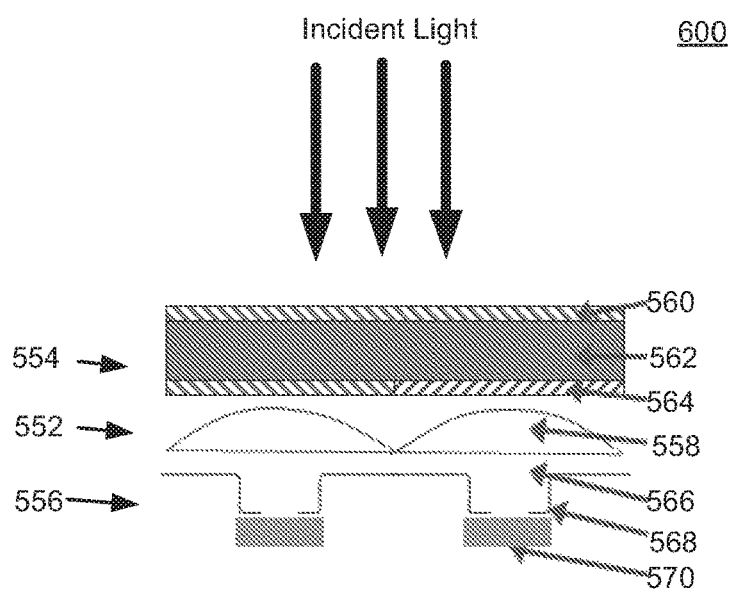
FIG. 13 is a cross-sectional schematic view of an example monolithic sensor with a longitudinal modulator formed in front of or above a microlens array.

FIG. 13 is a cross-sectional schematic view of another example monolithic sensor 600 with the longitudinal modulator 554 formed in front of or above a microlens array 552.

A method to construct a monolithic 3D sensor in accordance with any of the sensors depicted in FIGS. 7-8 and 12-13 is to begin with a sensor array such as CMOS or CCD, whether frontside or backside illuminated, with a planarized surface. The Fabry-Perot array can be deposited directly on the sensor array face using a series of lithographic production steps. An insulation layer comprising an oxide or other insulating material can be deposited on top of any surface that is required, followed by an electrically conductive coating such as indium-tin-oxide (ITO). An EOP layer can be coated on top of the ITO layer. A second ITO layer can be deposited above the EOP layer followed by a polymer polarizing layer. If needed, a microlens array can be deposited on the top. The materials and fabrication methods described above are exemplary, but other materials and fabrication may be used. The order of the layers may be different, such as no or similar conductive coatings outside of the reflective coatings, which may be in direct contact with the electro-optic layer. There may be other interface layers required, depending on material properties and process requirements, but the result is a monolithic stack of layers that are consistent with existing microfabrication processes. There may be 3D sensors constructed in other methods. Such structures may also be positioned to be in front of any microlens layers, or the structures may be integrated deeper into the imaging array structure. For example, the top-most reflector may be deposited on one side of a transparent substrate with the top-most ITO coating deposited on the other side. This coated substrate can be mechanically positioned above the sensor array. Other similar adjustments can be made in the fabrication and construction of the 3D sensor.

The modulators, sensors, and integrated, monolithic sensor systems disclosed herein may be used in 3D systems and/or to perform 3D methods, including at least some of those disclosed in the U.S. Pat. No. 8,471,895 B2, which is incorporated by reference in its entirety as if fully set forth herein (referred to herein as the "'895 patent") and U.S. patent application Ser. No. 15/823,482, filed on Nov. 27, 2017 and Ser. No. 15/857,416, filed on Dec. 28, 2017, the subject matter of both applications being incorporated by reference as though set forth herein in their entireties.

The sensor systems described herein provide compact 3D sensors. Several aspects provide the capability of a more compact, monolithic sensor. By modulating the light field in front of each light sensor pixel or groups of pixels to affect the photon signal, time or depth information (i.e., range information) may be more efficiently obtained from the incident light field.

The system described in the '895 patent made use of a modulator such as Pockets cell and bulk electro-optic materials to modulate the returned light field in time. The present systems disclosed herein provide the capability to create a compact 3D "chip-scale" distance estimation sensor by placing a thin modulator in close proximity in front of the light detector array. In one embodiment, the thin modulator may use the same fabrication processes used to produce the sensing array to include the thin modulator on the sensing array. In particular, the design, placement, and choice of electro-optic materials reduces the required activation voltage. The reduction in voltage reduces the Size, Weight, and Power (low SWaP) and/or volume required for many applications. In particular, the reduction of power enables chip-scale imagers that may be used in small form factor devices such as handheld devices and applications.

The structure and operation of several exemplary sensor systems are illustrated in FIGS. 1-9. The sensor 300 of FIG. 7 is used as a reference example in the description that follows; however, it should be understood that the other disclosed sensors may likewise be used instead. For example, FIG. 7 shows an integrated sensor system 300 having a first reflective element 310, electro-optic material 314, and a second reflective element 318. Not shown is an externally triggered light source for illuminating a scene to create the incident returned light received by the sensor 300, which may be used with any of the sensor systems described herein to illuminate a scene of interest. The light source may emit a short pulse, for example, on the order of 100 nS. This light source could be any source with sufficient brightness. In one example, the light source is a laser diode that emits light at 808 nm. 808 nm is only mentioned as one example, and other wavelengths may be used, for example, the system of FIG. 7 may be designed for any ultraviolet, visible, near infrared, short-wave infrared, or long wave infrared range using elements compatible with each wavelength range. Light sources such as any those described in the '895 patent and U.S. patent application Ser. No. 15/845,719, entitled "Driver Circuit Usable for Supplying Pulsed Light Source," filed Dec. 18, 2017 (which is hereby incorporated by reference in its entirety) may be used with the systems disclosed herein in some circumstances.

The returned light field (reflected or scattered from a scene) passes through the lenslet array (e.g., micro lens array 302 of FIG. 7), passes through the first reflector (e.g., reflective coating 310), and the first electrical conductor (e.g., top electrically conductive coating 312, which may be a transparent electrode such as ITO). The light then passes through a thin modulating material 314 (e.g., longitudinal EO material) sandwiched between the two transparent electrodes 312, 316 (e.g., top and bottom electrically conductive coatings) and the bottom reflector 318 (e.g., bottom reflective coating), before finally landing on the photosensitive array 306, detector, CCD array, CMOS array, or other light sensitive detector array.

The modulating layer (e.g., longitudinal electro-optic material) can be constructed of electro-optically active materials such as an electro-optic polymer (EOP), electro-optic crystals (EO), electro-optic ceramics (EOCe), or other similar electro-optic materials or material that changes its properties with an applied voltage. The use of an EOP, EO, or EOCe material can result in lower activation voltages to obtain the desired contrast ratio between when the modulator is off and when it is turned on full because such materials can have electro-optic coefficients of 30 pm/V, 50 pm/V, 100 pm/V, or even higher. Such materials can also be applied in thin layers, sometimes as thin as 1 µm, or 10 µm, or greater. For some embodiments, a layer thinner than 1 µm can be used. The EO layer thickness can be more or less than these thicknesses. The material and thickness may be chosen such that the modulator capacitance is less than 1 µF, less than 100 nF, less than 10 nF, or less than 1 nF For an EO modulating layer that is fabricated such that there is a birefringence that induces the phase retardation and resulting modulation, a compensation means can be included to compensate the off-axis birefringence so that the light rays propagating at non-normal angles of incidence receive approximately the same amount of phase retardation as the rays at normal angles of incidence. To compensate for birefringence, the EOC, EOCe or EOP can be fabricated to have one or more layers of EO active or non-EO active materials with the opposite sign of birefringence to the first EOC, EOCe, or EOP layer. Additionally/alternatively, other non-electro-optically active polymers, crystals, or ceramics can have birefringence induced by physical stress or other means. Such a birefringence compensating layer (or layers) can be added to the modulating layer, either between the electrodes if not electro-optically active or external to the area between the electrodes, but still within the optical path of the sensor system. For some implementations, birefringence effects can be addressed by using thinner thickness of EOC, EOCe, or EOP layer. For other implementations using a Fabry-Perot design, the Q or resonance quality can be lessened to make the system less sensitive to birefringence or other imperfections.

Several implementations of a suitable EOP, and EO, and an EOCe are now described, each of which may be used in any of the sensor systems disclosed herein, for example, the sensor systems 300, 350 shown in FIGS. 7 and 8.

The disclosed sensors essentially put the temporal sensitivity of conventional TOP 3D camera approaches into the optics in front of the CMOS sensor array instead of in the electronics behind it, as is traditionally done. Some Electro-optic polymers, electro-optic ceramics, and electro-optic crystals are a class of materials that have electro-optic responses up to 40× greater than traditional crystalline materials. Such polymers, ceramics and crystals may include $KH_2PO_4$, $KD_2PO_4$, $LiNbO_3$, or $LiTaO_3$. These materials have proportionally lower drive voltages. In the case of polymers, these materials can be applied in different methods than ceramics or crystals. They can also be applied via spin-coating for simplified manufacture. Other performance benefits, such as low birefringence, low temperature sensitivity, or low dielectric constants can also be obtained dependent upon the material selected.

In the case of electro-optic polymers or electro-optic ceramics, these materials are typically a special compound that is added to a base material, such as an organic polymer matrix such as PMMA (Poly(methyl methacrylate)). The base may be chosen to match the refractive index, thus ceramic materials (with a typically higher refractive index) would use a different base. Other polymer bases can be used. To be effective, the molecules in some materials must be aligned to a common axis using an applied "poling" voltage at elevated temperatures (150-200° C. or sometime higher or lower) to maximize the electro-optic coefficient $r_{33}$ or other coefficients as appropriate. For the disclosed monolithic sensors, the poling field can be applied using the same ITO or other electrodes as is used for operation, just at the elevated temperature, during the manufacturing process. In some embodiments, the poling field may be applied in a different direction from the field direction formed by the electrodes (such as ITO electrodes) during operation. In some cases, the poling electrodes may be temporary and be removed before operation. In some embodiments, the poling field and the modulating field in the same direction.

The process of poling the electro-optic material may be one known in the art of poled electro-optic materials, whether polymer, ceramic, or crystalline. Crystalline materials have a naturally long-range order. This order may include the property of non-centrosymmetry. The EO material (polymer, ceramic, or crystal) should be non-centrosymmetric in order to exhibit the Pockets effect or first-order electro-optic effect. Ceramics typically have a long-range order, but only within the "grain" of the ceramic. A collection of ceramic grains, comprising the ceramic substrate itself, is not guaranteed to have the property of non-centrosymmetry. Finally, polymers may or may not have an intrinsic long-range order.

The issue with EO materials, especially polymer and ceramic are the lack of order. In order to induce a non-centrosymmetric order, the material is typically processed by a "poling" process. The desired electrical properties can only be found in non-centrosymmetric materials. To break the potentially naturally occurring "centrosymmetric symmetry," the polymers, ceramics, or sometimes crystalline materials have to be polarized. The resulting polarization can be caused by the orientation of dipoles and/or domains, the build-up of charge layers in heterogeneous polymer materials, as well as a combination of both effects. In order to achieve dipole orientation in the material, a sufficiently high electric field must be applied between the surfaces of a polymer film or layer. There are various possibilities for generating the electric field across the sample thickness. Often the internal electric field is generated by charging the polymer in a corona discharge, by poling two-side metallized samples in direct electrode contact, by depositing charge layers with an electron beam or by charging the surface with a liquid contact. In some cases, the polymer (one such polymer is known as poly-vinylidene fluoride or PVDF with the chemical symbol of $[C_2H_2F_7]_n$) is a natural ferro-electric, in which case the temperature should be raised above a certain temperature when voltage is applied. This temperature is known as the ferroelectric transition temperature. Upon applying the correct voltage appropriate for the material, the material will assume a non-centrosymmetric orientation upon cooling. Other materials, such as a base polymer consisting of polycarbonate which has been doped with 35 wt % of dipolar phenyltetraene chromophore, also known as SEO100, is poled using a poling voltage of 235V at a temperature of approximately 150° C. SEO100 is only listed as an example. Other composite polymers bases consisting of polymethyl methacrylate, polycarbonate, cellulose acetate, polyethylene to list only a few substrate polymers can also be modified through the addition of the same or alternate chromophores or mixtures of chromophores, resulting in behavior similar to SEO100 and then poled. These pole-able polymers have characteristics (poling voltages and poling temperatures) specific to those particular entities. Once the entities have been manufactured (poled) and the electrodes have been successfully applied, the materials are ready to use as phase modulators within the Fabry-Perot cavity.

The foregoing EO materials may be used in any of the modulators or sensor systems disclosed herein. In addition, in some embodiments, other materials may be used that may be epitaxially grown on the planarization layer of an image sensor or at other steps in the image sensor fabrication process or on separate substrates that can be attached with epoxy or other process to the light sensor or sensor array. In some of these grown materials, patterns can be created by different etching steps or substrate preparation to have the material grow in different crystal axis (or the equivalent) orientations,

Phase-Based Modulator Using EO Polymers (Fabry-Perot Modulator)

For the FPC structures illustrated in FIGS. 1-2 and 7, the change in phase, $\Delta\varphi$, for an electro-optic polymer material (used as EO material 32, 314) is related to the electro-optic coefficient by the relation $$\Delta\phi = \frac{2\pi\Delta nl}{\lambda} = \frac{\pi n^3 r_{33} lV}{\lambda d} \qquad \text{(Eq. 1)}$$

where n is the refractive index of the polymer, $r_{ij}$ is the electro-optic coefficient, $\lambda$ is the wavelength of the light, l is the thickness in the propagation direction, and d is the thickness in the direction of the applied voltage V. In the case of the longitudinal excitation of the FPC, the material thickness, l, is the same as the distance over which the voltage is applied, d. In a transverse excitation configuration, l may be different than d.

The necessary amplitude modulation can be obtained using a Fabry-Perot cavity, formed by surrounding the EO polymer with reflective layers. In this case, the corresponding transmission intensity, T, for a Fabry-Perot modulator is given by $$T = \frac{1}{1 + F \sin^2\left(\frac{\Delta\phi}{2}\right)}, \qquad \text{(Eq. 2)}$$

where F is the finesse coefficient $4R/(1-R)^2$ for etalon reflectivity R. For thin film etalons, the finesse can be >100 while still maintaining relative insensitivity to angle of incidence and temperature (similar to the sensitivity difference between zero-order and multi-order waveplates).

In some configurations, a poled polymer such as PVDF or SEO100 is produced with either transverse or longitudinal electrodes. Once the polymer is placed in the Fabry-Perot cavity, an externally applied voltage is applied. This results in direct modulation of the incoming light. Using such an FPC configured as shown in any of FIGS. 1-8, this timed light modulation can be used to determine distance using the methods as disclosed in the '895 patent, which is incorporated herein by references in its entirety.

Examples of longitudinal and transverse electro-optic Fabry-Perot monolithic sensors 300, 350 are illustrated in FIGS. 7 and 8, respectively. In these sensors 300, 350, the additional coatings are illustrated as layered in thin layers on top of the existing $SiO_2$ passivation layer 328 of a conventional silicon-based CMOS sensor array 306. For a Fabry Perot-based modulator, the EO polymer material may positioned between the two reflective coatings 310, 318, with each reflective coating having intrinsic reflectivity of approximately 85% for a finesse of 160 in some embodiments; or in other embodiments, a reflectivity of approximately 94% for a finesse of 1000. Other reflectivity values may be used, ranging between 0%-100%.

The resulting light transmission for the FPC layer 304 as a function of applied voltage is shown in FIG. 9 for the finesses listed above, in a longitudinal modulator coefficient, with an electro-optic coefficient of 150 pm/V. This voltage may be applied uniformly across the aperture of the sensor using transparent electrode layers. Indium tin oxide (ITO) is a material commonly employed for transparent conductive coatings. Other transparent electrodes (which are electrically conductive but also allow light transmittance) may be used in place of ITO, such as IZTO or other conductive oxides, or gold (or other metal) mesh or thin metal layers that are transparent or semi-transparent.

Fabry-Perot etalons may be sensitive to angle of the internally impinging light field. The angular sensitivity has prevented the use of Fabry-Perot electro-optic modulators in the past for some applications. In the sensor systems and modulators disclosed herein, the thickness of the etalons may be about 0.0012 mm thick (1.2 microns or 1.2e-06 m thick). In this configuration, the acceptance angles of 14° and 20° FWHM can be achieved as shown in FIG. 10. This is equivalent to the angular acceptance of an f/3.5 and f/2.7 lens.

Temperature sensitivities may likewise be significantly reduced because of the thin layer used in the Fabry-Perot cavities of the sensors described herein. The low f # (high angular acceptance) can be used so that the sensor systems and modulators for the distance measurement of each pixel on the 2D image, allowing the direct generation of the 3D (position+distance) data. Thus, the sensor systems and/or modulators disclosed herein may permit a new application, namely, a chip-level, 3D measurement camera, among other applications.

In some embodiments, the triggering of a longitudinal Fabry-Perot cavity modulation may only require 34-70V at 808 nm—a 100× improvement over existing Pockets cell modulators not employing the disclosed Fabry-Perot cavity sensor systems and modulators.

The Fabry Perot EO modulator of the monolithic 3D sensors (sensor systems) disclosed herein can achieve >80% modulation depth with approximately 30 V. Because the EO polymer is thin (about 1.2 μm), the angular acceptance is also high. The modulator functionality can be achieved using a stack of thin films deposited on top of the existing $SiO_2$ passivation layer of a CMOS sensor array, as shown in FIGS. 7-8 and 12-13.

In addition, in order to account for variations in illumination patterns or surface reflectivity, a normalization image may be produced through the same optics used in any of the disclosed sensor systems. In order to do this, the reflective layers in a Fabry-Perot sensor system can be spatially patterned in much the same way that color sensors now have patterned color filters placed directly above each pixel (e.g., a Bayer pattern, a checkerboard pattern, or other predefined pattern). In the case where Fabry-Perot modulation is used, every other pixel or some other suitable pattern may have an anti-reflective or no reflective layer above and/or below the EO polymer or EO material so that no modulation occurs with applied voltage and nearly all of the incident light is transmitted to the pixel. In some embodiments, the ITO may be patterned so that only the portion of the EO layer above some pixels will experience an applied voltage or electric field. The pattern may be formed in the modulator layers on a pixel-by-pixel basis, or based on groups of pixels wherein a group of two or more pixels are included in a particular pattern area—either an unmodulated area or reflective modulated area of the pattern. The modulated and unmodulated responses can then be interpolated for the other half of the pixels, in similar fashion to how RGB colors are interpolated for the other colored pixels. This is one particular, additional configuration of the disclosed sensor systems.

Alternatively, the normalization image may be obtained by using a second image that is acquired at a different time, either earlier or later, than the modulated image using the same sensor and same pixels or detectors. This approach of time-interleaving modulated and unmodulated images or responses can be used with any of the modulation solutions described herein.

In other embodiments, the modulator layer may be comprised of a material that, under an applied electric field, induces a phase change in the transmitted light that results in a change in polarization state, similar to many of the embodiments described in the '895 patent. Such an embodiment is illustrated in FIG. 12. The polarizer layer may be patterned, for example, in the manner disclosed regarding the polarization grids described in U.S. patent application Ser. No. 15/445,560, filed on Feb. 28, 2017, and entitled "3D Imaging System and Method," which is hereby incorporated by reference in its entirety; or it may be a constant polarizer layer or film or other structure. Such modulating layers can be constructed using longitudinal or transverse electrode arrangements as described above. In some embodiments the required poling of the EO material, the direction of the poling field is in the same direction as the modulating field. In some embodiments, the poling field may be in a different direction than the modulating field.

Additional Examples of Electro-Optic Modulators within Fabry-Perot Cavities

The following describes certain example structures and materials for one or more electro-optic modulators usable within a Fabry-Perot cavity, such as the any of the FPCs disclosed herein. Additional information regarding these structures, material, and modulators may be found in U.S. patent application Ser. No. 15/857,263, entitled "Wide Field of View Electro-Optic Modulator and Methods and Systems of Manufacturing and Using Same," file Dec. 28, 2017, which is hereby incorporated by reference in its entirety.

As a first example, an electro-optic modulator (EOM) within a Fabry-Perot cavity having an optical axis may include: a first electro-optic material configured to receive light, the first electro-optic material having a first optic axis indicating a direction through the first electro-optic material along which a ray of light passing through the first electro-optic material suffers no birefringence, the first electro-optic material being positioned within the modulator so that the first optic axis is not parallel to the optical axis of the modulator; a half-wave plate configured to receive light output from the first electro-optic material; and a second electro-optic material configured to receive light output from the half-wave plate, the second electro-optic material having a second optic axis indicating a direction through the second electro-optic material along which a ray of light passing through the second electro-optic material suffers no birefringence, the second electro-optic material being positioned within the modulator so that the second optic axis is not parallel to the optical axis of the modulator. Electrodes at either end of the modulator are included, configured in a longitudinal fashion, where the transmitted light vector is approximately parallel to the applied electric field. The electrodes may be configured so that the electric field is generally transverse to the optical axis of the modulator.

The first optic axis may be orthogonal to the optical axis of the modulator. And the second optic axis may point in a direction opposite the first optic axis.

For example, the first optic axis may orthogonal to the optical axis of the modulator, and the second optic axis may be orthogonal to the optical axis of the modulator, wherein the second optic axis points in a direction opposite the first optic axis.

A second example EOM in a Fabry-Perot cavity may include an EOM having an optical axis. The EOM includes a first electro-optic material configured to receive light, the first electro-optic material having a first optic axis indicating a direction through the first electro-optic material along which a ray of light passing through the first electro-optic material suffers no birefringence, the first electro-optic material being positioned within the modulator so that the first optic axis is not parallel to the optical axis of the modulator; a first half-wave plate configured to receive light output from the first electro-optic material; a second electro-optic material configured to receive light output from the half-wave plate, the second electro-optic material having a second optic axis indicating a direction through the second electro-optic material along which a ray of light passing through the second electro-optic material suffers no birefringence, the second electro-optic material being positioned within the modulator so that the second optic axis is not parallel to the optical axis of the modulator; a third electro-optic material configured to receive light output from the second electro-optic material, the third electro-optic material having a third optic axis indicating a direction through the third electro-optic material along which a ray of light passing through the third electro-optic material suffers no birefringence, the third electro-optic material being positioned within the modulator so that the third optic axis is not parallel to the optical axis of the modulator; a second half-wave plate configured to receive light output from the third electro-optic material; a fourth electro-optic material configured to receive light output from the second half-wave plate, the fourth electro-optic material having a fourth optic axis indicating a direction through the fourth electro-optic material along which a ray of light passing through the fourth electro-optic material suffers no birefringence, the fourth electro-optic material being positioned within the modulator so that the fourth optic axis is not parallel to the optical axis of the modulator.

In the second EOM, the second optic axis may point in a direction opposite the first optic axis, and the third optic axis points in a direction opposite the fourth optic axis. For example, the first optic axis may be orthogonal to the optical axis of the modulator, the second optic axis may be orthogonal to the optical axis of the modulator, the third optic axis may be orthogonal to the optical axis of the modulator, the fourth optic axis may be orthogonal to the optical axis of the modulator, and wherein the second optic axis may point in a direction opposite the first optic axis, and the third optic axis may point in a direction opposite the fourth optic axis.

In each EOM example, the thicknesses of the EO materials may be about equal, or alternatively, they may each differ in thickness. The thicknesses of each EO material may be each less than 10 μm. For example, the thickness of one or more of the EO materials may be less than 1 μm.

The half-wave plate may be a zero-order wave plate, wherein the half-wave plate is a combination of waveplates to create an effective zero-order wave plate. The half-wave plate may be an optical rotator, wherein the half-wave plate is a combination of zero-order half-waveplates to create an optical rotator.

Example Electro-Optic (EO) Materials

Any suitable electro-optic material may be used in the disclosed EOMs and modulators, for example the FPCs disclosed herein. For example, the EO materials may be lithium niobate ($LiNbO_3$), lithium tantalate ($LiTaO_3$), or potassium dihydrogen phosphate (KD*P) crystals. All of these are uniaxial crystals that are negatively birefringent.

Other materials may be used for electro-optic materials. For example, the materials may be isostructural similar materials or solid solutions of lithium niobate ($LiNbO_3$), lithium tantalate ($LiTaO_3$), or potassium dihydrogen phosphate (KDP) crystals. For example, a solid solution exists between lithium niobate and lithium tantalate, Any material with a composition of $LiNb_xTa_{(1-x)}O_3$; where x is a number bounded between 0 and 1, i.e., $0 \le x \le 1$, may be a suitable material.

Other materials that may be used for electro-optic materials include potassium dihydrogen phosphate and its isomorphs. For potassium dihydrogen phosphate, a solid solution exists where hydrogen is substituted by deuterium (heavy hydrogen). Any solid solution of $KH_{2x}D_{2(1-x)}PO_4$ where x is a number bounded between 0 and 1, i.e., $0 \le x \le 1$, may be a suitable material. KD*P ($KD_2PO_4$) (KD*P is also known as DKDP, deuterated potassium dihydrogen phosphate, potassium di-deuterium phosphate, or deuterated potassium phosphate mono-basic) may be used for electro-optic materials. The materials may alternatively consist of solid solutions of materials which are isomorphs of KDP or KD*P. For example, $NH_4$, Rb, and Cs may be substituted for K, and As may be substituted for P. All of these isostructural variants may be suitable materials for the EOM 10. The isostructural materials to DKDP may generally consists of a group of chemicals having the generic formula $A_xB_yC_zH_{2r}D_{2(1-r)}F_sG_{(1-s)}O_4$; where $x+y+z=1$; $0 \le r \le 1$; $0 \le s \le 1$; A, B, C are selected from the elements or ions of $NH_4$, K, Rb, Cs; H is hydrogen and D is deuterium; and F and G are selected from the ions phosphorous or arsenic. For example, when y=z=r=s=0 and A=K, and G=P the described compound is the material $KD_2PO_4$.

Other materials that may be used for electro-optic materials include materials selected from the group consisting of or isostructural to PZT (lead zirconate titanate). Such a group consists of a chemical having the generic formula for oxide ferroelectric $\underline{Pb}[Zr_xTi_{1-x}]O_3$, where $0 \le x \le 1$.

Other materials that may be used for electro-optic materials include any material, crystal or ceramic selected from the generic formula for an oxide ferroelectric $A_xB_yC_zFO_3$; where $x+y+z=1$; A and B and C are selected from the following elements or ions: Ba, Sr, Ca, Mg, Pb, Bi; F is selected from the following elements or ions: Ti or Zr or partial solid solution between each element. A common electro-optic semiconductor compound that may be used, $BaTiO_3$, is obtained from the generic formula where A=Ba, F=Ti, x=1, y=z=0.

Other materials that may be used for electro-optic materials include any material, crystal or ceramic selected from the generic formula for a semiconductor $(A_xB_yC_z)(D_qE_rF_s)$; where $x+y+z=1$ and $q+r+s=1$; A and B and C are selected from the following elements or ions Ga, In, or Al; and D, E, and F are each selected from P, As, or Sb. An electro-optic material that may be used is the semiconductor compound GaAs, which is obtained from the generic formula where A=Ga, D=As, x=1, q=1, x=y=r=s=0.

Other materials that may be used for electro-optic materials include any material, crystal or ceramic selected from the generic formula for a semiconductor $(A_xB_yC_z)(G_qH_rL_s)$; where $x+y+z=1$ and $q+r+s=1$; A and B and C are each selected from the following elements or ions Zn, Cd, Hg; and G, H, and L are each selected from S, Se, Te. An exemplary electro-optic material that may be used is the semiconductor compound and electro-optic material CdS, which is obtained from this generic formula where A=Cd, G=S, x=1, q=1, x=y=r=s=0.

Other materials that may be used for electro-optic materials include any material, crystal or ceramic selected from the generic formula $AlO_3$; where A is selected from the elements or ions H, Li, K. Rb, Cs. For example, the ferro-electric material $KIO_3$, also known as potassium iodate, may be used, where A=K in the formula.

Other materials that may be used for electro-optic materials include any material, crystal or ceramic selected from the generic formula for ferroelectric polymers. Such polymers include but are not limited to polyvinylidene fluoride or (PVDF), also written as $(CH_2CF_2)_n$, or vinylidene fluoride-trifluoroethylene copolymer, also written as $(CH_2CF_2)_x(CHFCF_2)_{(1-x)}$, or $(VDF)_x(TRFE)_{(1-x)}$ where $0 \le x \le 1$.

Other materials that may be used for electro-optic materials may include liquid crystals, other material yet to be invented, or the like. The material arrangement and applied voltage is determined based on the material and system requirements.

The first electro-optic material and second electro-optic material may be the same material. Alternatively, the electro-optic materials may each be a different material. Any suitable combination of the foregoing materials described above may be used for the materials.

Although certain examples of the EO materials may be birefringent, the EO materials may alternatively have a small or zero birefringence in some cases—as in the case of cubic symmetry materials, such as GaAs, or in uniaxial or biaxial materials in which the birefringence is made small. For example, one or both of the EO materials may have no birefringence. Alternatively, the EOM may have a single EO material with little or no birefringence instead of two slabs of EO material.

Additionally/alternatively, the EO materials may include generic poled polymers. Such polymers include but are not limited to SEO100.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing or multiple processors, rather than sequentially. In addition, while certain aspects of this disclosure are described as being performed by a single module or component for purposes of clarity, it should be understood that the techniques of this disclosure may be performed by any suitable combination of components or modules associated with a particular described implementation.

The foregoing description is illustrative and not restrictive. Although certain exemplary embodiments have been described, other embodiments, combinations and modifications involving the invention will occur readily to those of ordinary skill in the art in view of the foregoing teachings. Therefore, this invention is to be limited only by the following claims, which cover at least some of the disclosed embodiments, as well as all other such embodiments and modifications when viewed in conjunction with the above specification and accompanying drawings.

What is claimed:

1. A 3D imaging system configured to permit integration of an intensity modulator with an angular acceptance equivalent to that of at least an f/3.5 lens, comprising:
   a Fabry-Perot cavity having a first partially-reflective surface for receiving incident light and a second partially-reflective surface from which light exits, the first and second partially-reflective surfaces having a Fabry-Perot mirror reflectivity for high-contrast transmission of at least 80%;
   an electro-optic material placed within the Fabry-Perot cavity between the first partially-reflective surface and the second partially-reflective surface and configured so that at least some of the incident light passes through the electro-optic material, the electro-optic material and Fabry-Perot cavity having an optical path length configured to establish a finesse that facilitates the angular acceptance of the 3D imaging system;
   a plurality of electrodes configured to produce an electric field within the electro-optic material;
   a voltage driver, in contact with at least one of the electrodes, configured to modulate as a function of time the electric field within the electro-optic material so that the incident light passing through the electro-optic material is temporally modulated according to a predetermined modulation waveform, in which the electro-optic material prevents any current flow between the electrodes at drive voltages of 100 volts or less; and
   a light sensor configured to receive light that exits the second partially-reflective surface of the Fabry-Perot cavity and convert the light into one or more electronic signals.

2. The 3D imaging system of claim 1, further comprising:
   a processor subsystem, operatively coupled to the light sensor, configured to generate 3D image data based on the electronic signals.

3. The 3D imaging system of claim 2, wherein the processor subsystem is further configured to control the voltage driver so as to modulate the electric field.

4. The 3D imaging system of claim 1, wherein the electrodes are transparent longitudinal electrodes configured to longitudinally excite electro-optic material.

5. The 3D imaging system of claim 4, wherein the transparent longitudinal electrodes are located at opposing sides of the electro-optic material and each transparent longitudinal electrode is segmented into multiple electrodes.

6. The 3D imaging system of claim 1, wherein the electrodes are transverse electrodes configured to transversely excite electro-optic material.

7. The 3D imaging system of claim 6, wherein the transverse electrodes are located at opposing ends of the electro-optic material and each transverse electrode is segmented into multiple electrodes.

8. The 3D imaging system of claim 1, wherein the electro-optic material is selected from the group consisting of potassium iodate ($KIO_3$), GaAs, lithium niobate ($LiNbO_3$), lithium tantalate ($LiTaO_3$), and potassium dihydrogen phosphate (KD*P).

9. The 3D imaging system of claim 1, wherein the electro-optic material is selected from the group consisting of poly-vinylidene fluoride (PVDF or [C2H2F2]n) and a vinylidene fluoride-trifluoroethylene copolymer $(CH_2CF_2)_x$ $(CHFCF_2)_{(1-x)}$, or $(VDF)_x(TRFE)_{(1-x)}$, where $0 \leq x \leq 1$.

10. The 3D imaging system of claim 1, wherein the electro-optic material is selected from the group consisting of a polymer, polycarbonate, modified polycarbonate, cellulose acetate, polyethylene, and polymethyl methacrylate.

11. The 3D imaging system of claim 1, wherein the electro-optic material is a polymer material that has been doped with a chromophore or combination of chromophores that have been aligned through application of a poling field.

12. The 3D imaging system of claim 1, wherein the electro-optic material is selected from the group consisting of potassium dihydrogen phosphate, a solid solution where hydrogen is substituted by deuterium, a solid solution of $KH_{2x}D_{2(1-x)}PO_4$ where x is $0 \leq x \leq 1$, $KD_2PO_4$, and solid solutions of materials which are isomorphs of KDP or KD*P.

13. The 3D imaging system of claim 1, wherein the electro-optic material is a DKDP material that consists of a group of chemicals having the generic formula $A_xB_yC_zH_{2r}D_{2(1-r)}F_sG_{(1-s)}O_4$; where $x+y+z=1$; $0 \leq r \leq 1$; $0 \leq s \leq 1$; where A,B,C are selected from $NH_4$, K, Rb, or Cs; where H is hydrogen and D is deuterium; and F and G are selected from phosphorous or arsenic.

14. The 3D imaging system of claim 1, wherein the electro-optic material is a crystal or ceramic selected from the generic formula for a semiconductor $(A_xB_yC_z)(D_qE_rF_s)$; where $x+y+z=1$ and $q+r+s=1$; where A, B and C are each selected from the group consisting of Ga, In, and Al; and where D, E, and F are each selected from the group consisting of P, As, and Sb.

15. The 3D imaging system of claim 1, wherein the electro-optic material is a crystal or ceramic selected from the generic formula $AlO_3$; where A is selected from the group consisting of H, Li, K, Rb, Cs.

16. A method of capturing 3D data with a 3D imaging system configured to permit integration of an intensity modulator with an angular acceptance equivalent to that of at least an f/3.5 lens, comprising:
   receiving incident light at a Fabry-Perot cavity having a first partially-reflective surface receiving the incident light and a second partially-reflective surface from which light exits, the first and second partially-reflective surfaces having a Fabry-Perot mirror reflectivity for high-contrast transmission of at least 80%;

applying a voltage having a predetermined modulation waveform to an electrode configured to produce an electric field within an electro-optic material so that the incident light passing through the electro-optic material is temporally modulated according to the predetermined modulation waveform, in which the electro-optic material prevents any current flow between the electrode at drive voltages of 100 volts or less, the electro-optic material and Fabry-Perot cavity having an optical path length configured to establish a finesse that facilitates the angular acceptance of the 3D imaging system;

receiving light that exits the second partially-reflective surface of the Fabry-Perot cavity at a sensor, the sensor converting the received light into one or more electronic signals; and generating the 3D data based on the electronic signals.

17. The method of claim 16, wherein the electro-optic material is selected from the group consisting of polyvinylidene fluoride (PVDF or [C2H2F2]n) and a vinylidene fluoride-trifluoroethylene copolymer $((CH_2CF_2)_x(CHFCF_2)_{(1-x)}$, or $(VDF)_x(TRFE)_{(1-x)})$, where $0 \leq x \leq 1$.

18. The method of claim 16, wherein the electro-optic material is selected from the group consisting of a polymer, polycarbonate, modified polycarbonate, cellulose acetate, polyethylene, and polymethyl methacrylate.

19. The method of claim 16, wherein the electro-optic material is a polymer material that has been doped with a chromophore or combination of chromophores that have been aligned through application of a poling field.

20. The method of claim 16, wherein the electro-optic material is a crystal or ceramic selected from the generic formula for a semiconductor $(A_xB_yC_z)(D_qE_rF_s)$; where $x+y+z=1$ and $q+r+s=1$; where A, B and C are each selected from the group consisting of Ga, In, and Al; and where D, E, and F are each selected from the group consisting of P, As, and Sb.

* * * * *